United States Patent [19]

York

[11] 3,885,338

[45] May 27, 1975

[54] METHOD OF CONTROLLING THE MOVEMENT OF PELAGIC FISH AND/OR SIGNALING APPARATUS USE THEREFOR

[75] Inventor: Albert Garnett York, Wellington, New Zealand

[73] Assignee: New Zealand Inventions Development Authority, Wellington, New Zealand

[22] Filed: Nov. 6, 1972

[21] Appl. No.: 303,720

[30] Foreign Application Priority Data
Nov. 5, 1971 New Zealand .................. 165386

[52] U.S. Cl. ............................................... 43/17.1
[51] Int. Cl. ........................................... A01k 79/00
[58] Field of Search .................. 43/4.5, 17.1; 119/3; 340/3 A, 5 R; 181/0.5 J, 0.5 NP

[56] References Cited
UNITED STATES PATENTS

| | | | |
|---|---|---|---|
| 3,123,798 | 3/1964 | Holloway et al. | 340/3 R |
| 3,414,873 | 12/1968 | Richard et al. | 43/17.1 X |
| 3,524,276 | 8/1970 | Thomas et al. | 43/17.1 X |
| 3,680,245 | 8/1972 | Brooks | 43/17.1 |

FOREIGN PATENTS OR APPLICATIONS
44,669  4/1966  Germany ........................... 43/17.1

OTHER PUBLICATIONS
World Fishing, Attracting Fish by Sound, 1-1964, (Commercial Fisheries Abstracts, Vol. 19, No. 4, p. 8).

Primary Examiner—Hugh R. Chamblee

[57] ABSTRACT

A signalling apparatus for controlling the movement of pelagic fish and particularly tuna by producing underwater acoustic signals representing the natural attraction information selected from the swimming signal of the pelagic fish, the noise of feeding birds diving among the bait fish, the "breezing" signals of bait fish such as anchovy and combinations of these signals and repulsion signals selected from a low frequency acoustic signal, the acoustic signal produced by pelagic fish and a noise produced by a tuna when meshed in a gill net and combinations of these signals.

8 Claims, 2 Drawing Figures

METHOD OF CONTROLLING THE MOVEMENT OF PELAGIC FISH AND/OR SIGNALING APPARATUS USE THEREFOR

BACKGROUND OF THE INVENTION

This invention relates to methods of controlling the movement of pelagic fish and/or signalling apparatus used therefore.

The commercial importance of pelagic fish has been recognized for many years but known methods of fishing do not provide any generally accepted means for controlling the movement of the pelagic fish in the area being fished.

SUMMARY OF THE INVENTION

It is therefore an object of the present invention to provide a method of controlling the movement of the pelagic fish which will assist with commercial harvesting thereof.

It is a further object of the present invention to provide signalling apparatus which in normal fishing conditions will assist in attracting or in appropriate circumstances, repelling the pelagic fish.

Accordingly in one aspect the invention consists in a method of controlling the movement of pelagic fish comprising the steps of producing an underwater acoustic signal which will operate to attract the pelagic fish towards the signal source or repel the fish from the signal source by relying upon the acoustic signals the fish normally associate with feeding as the attractant and the acoustic signals the fish normally associate with danger as the repellent.

In a further aspect the invention consists in signalling apparatus to produce an underwater acoustic signal detectable by pelagic fish, the apparatus comprising an amplifier, transcribable storage means on which has been stored information corresponding to the natural signals the fish normally associate with feeding, a transcription unit operable on the transcribable storage means to produce an input signal to the amplifier, a transducer supplied by the amplifier to emit an underwater acoustic signal to attract the fish towards the signal source by producing the acoustic signal the fish normally associate with feeding.

More particularly in this aspect the invention consists in signalling apparatus to produce an underwater acoustic signal detectable by pelagic fish, the apparatus comprising an amplifier, transcribable storage means on which has been stored information corresponding to the natural signals the fish normally associate with feeding, and natural signals the fish normally associate with danger, a transcription unit operable on the transcribable storage means to produce an input signal to the amplifier, selection means to select the desired stored information, a transducer supplied by the amplifier to emit an under water acoustic signal which may be selected at will either to attract fish towards the signal source by producing the acoustic signal the fish normally associate with feeding or to repel the fish away from the signal source by producing the acoustic signal the fish normally associate with danger.

BRIEF DESCRIPTION OF THE DRAWINGS

One preferred form of the invention will now be described with reference to the drawings in which.

DETAILED DESCRIPTION OF THE PREFERRED EMBODIMENT

Figure 1:
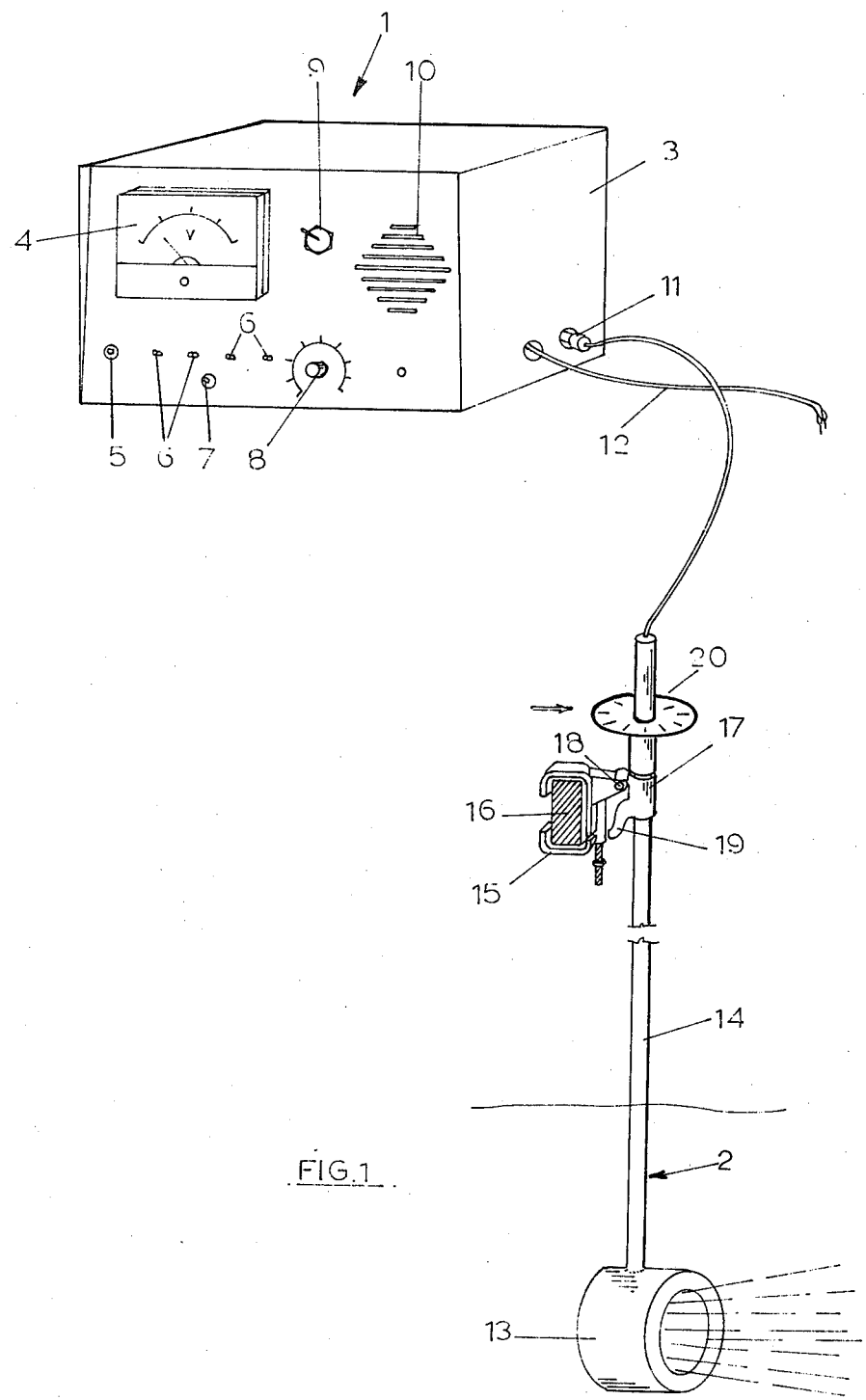
FIG. 1 is a diagrammatic representation of the signalling apparatus according to the present invention.

In the preferred form of the invention signalling apparatus 1 is arranged to produce an underwater acoustic signal through the transducer 2. This signal is taken from a transcribable storage means with a transcription unit operable thereupon to supply an input signal to an amplifier which in turn supplies the transducer.

The control box 3 has the components which are not directly associated with the transducer mounted therein, and on the control panel there is provided a volt meter 4 to monitor the supply voltage, a channel selection button 5, channel indicating lights 6, a track selection switch 7, a gain control 8 and a change-over switch 9 so that the unit may be changed from a transmitter to a receiver. A loud-speaker 10 is also mounted in the box for use when the unit is operating as a receiver.

A co-axial socket 11 provides a detachable connection through the co-axial cable to the transducer 2. The lead 12 is from the power source preferably a 12 volt supply, for example, an ordinary 12 volt wet cell battery.

The transducer 2 is preferably an electric acoustic moving coil unit with directional properties and having a predetermined beam width characteristic which can be varied dependent upon the particular use and beam widths between 90° and 5° have been found to be possible with preferred results being achieved with a beam width of between 35° and 17°. The directional properties of the transducer are only required when the invention is used as a receiver, that is as a hydrophone for detecting fish. If two separate transducers were to be used, the transmitting one could well be omnidirectional. The transducer unit is of the type having a disc diaphragm center driven by a moving coil driver. In order to enable the equipment to be used while the vessel is under way, the transducer should be housed within an "asdic" hull mounted dome to reduce water noise. In many cases this is not required and the following practical arrangement can be used.

The directional transducer 13 is mounted on an arm 14 which is held in an adjustable clamp 15 arranged to be clamped on to the guard rail 16 of a fishing vessel and normally at the stern. The jaws of the clamp are adjustable and the arm 14 passes through a collar 17 which is pivotally supported at 18 so that when the stop 19 abuts with the fixed section of the clamp the hydrophone will be normally located for use but is free to be swung out of the water should this be desired. The stop is important when the apparatus is used with some vessels to prevent fouling with the propellor. Associated with the transducer is a bearing indicator which is diagrammatically represented at 20 so that the beam direction of the transducer is readily determinable by the operator when in use as a hydrophone.

Figure 2:
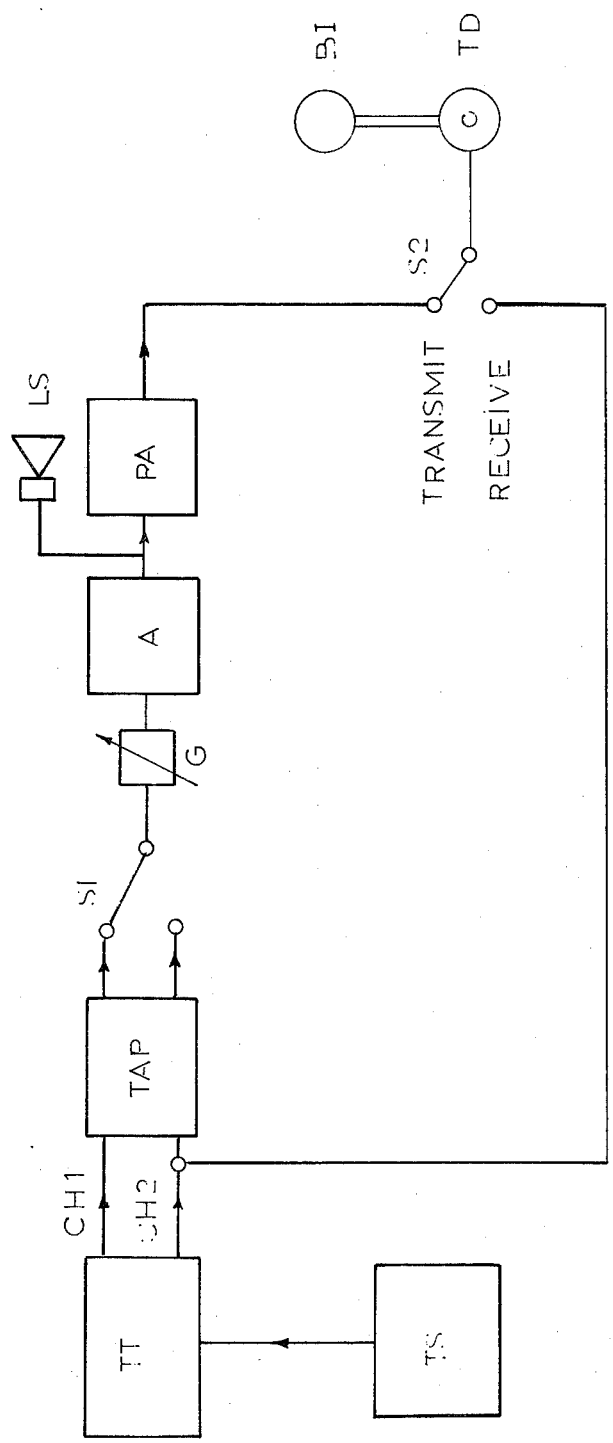
FIG. 2 is a schematic diagram of the operating components in the signalling apparatus.

The operating components will be more particularly described with reference to FIG. 2 where the abbreviations used have the following meaning:

TS — channel selector and indicator
TT — tape transcription unit
CH1 and CH2 — tracks 1 and 2 respectively
TAP — tape transcription unit replay preamplifier and equalizer G — gain control
A — driver amplifier
LS — loudspeaker
PA — power amplifier
TD — underwater acoustic/electric transducer
BI — transducer bearing indicator The storage means used in the preferred embodiment is a magnetic tape preferably in cartridge form. The tape has a total of eight information tracks grouped in four channels each of two tracks. One track of each channel contains "attraction information" as will be further described hereafter, while the other channel contains "repulsion information" again as will be further described later.

The tape transcription unit TT is a cartridge reproducer having a variable setting replay head which is set by the channel selector and indicator TS according to the type of information required. The push button selector switch 5 on the front of the panel is the operator control to select the desired channel and the lights 6 visually indicate the channel selected.

Both information output tracks from the replay head are fed to a pre-amplifier and equalizer TAP to provide frequency compensated outputs of an adequate signal level at the contacts of switch S1 which is the switch 7 shown on the control panel in FIG. 1. The position of the switch 7 determines whether the emitted underwater signal is one of "attraction" or "repulsion" as it selects the track to be transmitted. Facility for rapid change between the signal type is necessary when driving fish.

Following this switch a gain control is incorporated which effectively determines the intensity of the emitted signals. This gain control is variable by operating the control knob 8 on the front of the panel.

The output of the gain control feeds a driver amplifier A which provides sufficient signal to drive the power amplifier PA to the required output voltage and power. In order to obtain a satisfactory acoustic output from the transducer, the output should be a minimum of 1 watt and the preferred embodiment has a maximum capability of 20 watts.

The essential requirements of the electronic equipment are: low power consumption to conserve the vessel's batteries; frequency response substantially flat from 20 HZ to 20 KHZ and low distortion to enable the various sounds to be accurately reproduced. These requirements can be met using semi-conductor devices and normal high fidelity design techniques. Known protection circuitry to protect against incorrect supply polarity and shorted output should be incorporated.

The apparatus as described above is also designed to operate as a receiver. Due to this feature the amplifier output is fed to the underwater transducer via switch S2 shown on the control panel as switch 9. In the mode of "receive" the transducer acts as a hydrophone and picks up underwater sounds to produce an electrical output. By switching S2 to the receive position the transducer output may be applied to one track input of the tape pre-amplifier and equalizer. When the equipment is used as a hydrophone switch S1 must of course be switched to CH2. By feeding the transducer output through the tape pre-amplifier, ample electrical gain is insured thereby enabling weak acoustic underwater signals to be detected. The hydrophone signals are reproduced by a panel mounted loudspeaker which is driven by the driver amplifier, the necessary amplification being set by the gain control. Provision is made for head phones to be used in place of the loudspeaker and by using such headphones in conjuction with rotation of the transducer it is possible to determine reasonably accurately the direction of the received signal with respect to the boat by the indication given on the bearing indicator.

The present invention is concerned with means whereby pelagic fish can be attracted to a given area preferably a fishing vessel or repelled from a given area depending upon the circumstances by using an underwater acoustic signal which operates either as an attractant or a repellent to the pelagic fish.

The attraction signal can be selected from the swimming signal of the pelagic fish and particularly tuna. The noises made by feeding birds diving and anchovy or other similar bait fish swimming in the water or "breezing." Combinations of these signals may be used and depending upon circumstances one signal may be more successful than another. For this reason the plurality of tracks are provided on the signalling device and a selection of noises to attract the fish are recorded on one channel of each track.

An example of the selection which could be provided is as follows:

On one track the diving noise made by birds;

On the second track the swimming signal given off by the pelagic fish

On the third track the breezing noise produced by the anchovy, and

On the fourth track a combination of at least two or preferably the three noises produced on the other tracks.

The anchovy breezing produce a noise which may best be described as running a hose on to water. The diving of birds feeding on the anchovy or other of the bait fish produces a distinctive plop. The swimming signal will vary depending upon the type of pelagic fish, but for tuna it produces a distinctive sound similar to an increase in volume of the normal offshore background level. Also, faint squeaks are associated with a school of skipjack tuna.

The signals may be obtained using one or more sonobuoys preferably having a frequency response from 30 to 20,000 Hz used in conjuction with a high quality receiver to record the signals on a tape recorder with a frequency response of 30 to 20,000 Hz. This naturally recorded signal can be edited to produce the selected signals referred to previously. Also, once a natural signal has been obtained, it would be possible for a simulated signal matching the natural signal to be produced artificially.

The repulsion signal does not appear as critical and many low frequency sounds will operate to repel pelagic fish. However, one sound which is particularly effective is the capture signal produced by a tuna when meshed in a gill net. The noise is a distinctive machine-gun rattle.

The noise produced by the fishing vessel when operating may give rise to underwater signals which will repel pelagic fish. The apparatus according to the present invention when operating as a receiver will enable these signals to be monitored and if it appears undesirable signals are being given out remedial action may be taken. Also, the best frequency at which the motor may be operated can be selected to minimize repulsion of the fish. The detector in the receive mode will also enable signals from feeding birds or schooling anchovy to be picked up and possible noises from pelagic fish so that the fishing vessel may itself be directed to the area where the fish are.

The repulsion signals will be effective in some fishing techniques. For example, at the opening in a purse-seine net just before the net is closed.

The signalling apparatus according to the present invention has four main functions:

1. It operates as an acoustic lure to attract fish to the fishing vessel.
2. It operates as a detection device to pick up signals produced by the fish.
3. It produces a repelling signal which the fish associates with danger.
4. It enables any unnatural noises made by the fishing vessel during operation to be detected and corrected, i.e. noises such as may be made by a loose rudder.

What I claim is:

1. A signalling apparatus for selectively producing an underwater acoustic signal detectable by pelagic fish, said apparatus comprising an amplifier, multi-channel transcribable storage means for storing information corresponding to natural signals which the fish normally associate with feeding and natural signals which the fish normally associate with danger, a transcription unit operable on said transcribable storage means to produce an input signal to said amplifier, selection means for selecting the desired stored information, and a transducer supplied by said amplifier to emit the underwater acoustic signal which may be selected at will either to attract the fish towards the signal source by producing the natural signals which the fish normally associate with feeding or to repel the fish away from the signal source by producing the natural signals which the fish normally associate with danger.

2. A signalling apparatus as claimed in claim 1, wherein said transcribable storage means comprises a plurality of information channels, each of said channels having two tracks, the natural signals which the fish associate with feeding being recorded on one track and the natural signals which the fish associate with danger being recorded on the other track.

3. A signalling apparatus as claimed in claim 2, further comprising channel selection means for selecting any one of said plurality of channels.

4. A signalling apparatus as claimed in claim 3, wherein the natural signals which the fish associate with feeding recorded on one track of each channel are selected from swimming signals of the pelagic fish, noise of feeding birds diving among bait fish, breezing signals of bait fish such as anchovy and combinations of these signals.

5. A signalling apparatus as claimed in claim 3, wherein the natural signals which the fish associate with danger recorded on the other track of each channel are selected from a low frequency acoustic signal, an acoustic signal produced by the pelagic fish, a noise produced by a tuna when meshed in a gill net, and combinations of these signals.

6. A method of controlling the movement of pelagic fish, said method comprising the step of selectively producing an underwater acoustic signal representing natural signals which the fish normally associate with feeding and natural signals which the fish normally associate with danger, the natural signals which the fish normally associate with feeding being employed as an attractant signal to attract the pelagic fish towards the signal source, the natural signals which the fish normally associate with danger being employed as a repellent signal to repel the pelagic fish from the signal source, the attractant signal being selected from a combination of swimming signals of the pelagic fish, noise of feeding birds diving among bait fish, and breezing signals of bait fish such as anchovy, the repellent signal being selected from a low frequency acoustic signal, an acoustic signal produced by the pelagic fish, a noise produced by a tuna when meshed in a gill net and combinations of these signals.

7. A signalling apparatus for selectively producing an underwater acoustic signal detectable by pelagic fish, said apparatus comprising
   an amplifier;
   multi-channel transcribable storage means for storing information corresponding to natural signals which the fish normally associate with feeding and natural signals which the fish normally associate with danger;
   a transcription unit operable on said transcribable storage means to produce an input signal to said amplifier;
   selection means for selecting the desired stored information; and
   a transducer supplied by said amplifier to emit the underwater acoustic signal which may be selected at will either to attract the fish towards the signal source by producing the natural signals which the fish normally associate with feeding or to repel the fish away from the signal by producing the natural signals which the fish normally associate with danger, said transducer comprising a directional hydrophone projector having a beam width which can be varied between 5° and 90°.

8. A signalling apparatus as claimed in claim 7, wherein said transducer is mounted upon an arm which can be pivotally clamped to a guard rail of a vessel at a controlled depth beneath the surface and having directional indicating means associated with mounting means.

* * * * *